US008827173B2

(12) United States Patent
Nutzati

(10) Patent No.: US 8,827,173 B2
(45) Date of Patent: Sep. 9, 2014

(54) TRACTION MAT

(71) Applicant: Asia Expo Consultants Limited, Hong Kong (HK)

(72) Inventor: Ronnie Nutzati, Wanchai (CN)

(73) Assignee: Asia Expo Consultants Limited, Hong Kong (CN)

( * ) Notice: Subject to any disclaimer, the term of this patent is extended or adjusted under 35 U.S.C. 154(b) by 34 days.

(21) Appl. No.: 13/653,147

(22) Filed: Oct. 16, 2012

(65) Prior Publication Data

US 2014/0103131 A1 Apr. 17, 2014

(51) Int. Cl.
*E01B 23/00* (2006.01)
*B60B 39/12* (2006.01)

(52) U.S. Cl.
USPC .......... 238/14

(58) Field of Classification Search
CPC ........ B60B 39/00; B60B 39/12; B60C 27/16; E01C 9/08
USPC .......... 238/14
See application file for complete search history.

(56) References Cited

U.S. PATENT DOCUMENTS

| | | | | |
|---|---|---|---|---|
| 1,430,471 A * | 9/1922 | Simon | 238/14 |
| 1,549,775 A * | 8/1925 | Keyser, Jr. | 238/14 |
| 2,422,006 A * | 6/1947 | Friedman | 238/14 |
| 3,997,110 A * | 12/1976 | Aumont | 238/14 |
| 4,681,482 A * | 7/1987 | Arciszewski et al. | 404/35 |
| 4,964,751 A * | 10/1990 | Rope et al. | 404/35 |
| 5,807,021 A * | 9/1998 | Aaron | 404/19 |
| 5,899,380 A * | 5/1999 | Beaulieu | 238/14 |
| 6,575,660 B1 * | 6/2003 | Davis et al. | 404/35 |
| 6,779,738 B1 * | 8/2004 | Stannard | 238/14 |
| 6,874,972 B2 * | 4/2005 | Davis et al. | 404/35 |
| 8,210,443 B2 * | 7/2012 | Studstill | 238/14 |
| 8,511,644 B2 * | 8/2013 | Biesse | 254/35 |
| 2004/0042851 A1 * | 3/2004 | Davis et al. | 404/35 |

* cited by examiner

*Primary Examiner* — Zachary Kuhfuss
(74) *Attorney, Agent, or Firm* — San Diego IP Law Group, LLP

(57) ABSTRACT

A traction mat for extricating the wheels of a vehicle in slippery road conditions comprising: a handle, a plurality of bars with protrusions to provide traction, and a wire connecting the handle and the bars together.

11 Claims, 11 Drawing Sheets

TRACTION MAT

BACKGROUND OF THE INVENTION

1. Field of Invention

This invention relates to a traction mat that is placed under the wheels of a vehicle to provide extra traction in snow, mud, sand, or other slippery road conditions.

2. Description of Related Art

A traction mat is an apparatus that can be placed under the wheels of a car to provide additional traction during slippery road conditions. A great variety of traction mats already exist. However, these traction mats fall short because they cannot be easily folded or rolled for storage convenience in a relatively small place.

SUMMARY OF THE INVENTION

The present invention overcomes these and other deficiencies of the prior art by providing a traction mat that can be placed under the wheels of a vehicle to provide the necessary traction to extricate a vehicle from snow, mud, sand, or other slippery road conditions. The traction mat provides structure that allows it to be easily folded or rolled for storage convenience in a relatively small place.

In an embodiment of the invention, a traction mat comprises: a handle, a plurality of bars, and a wire that connects the handle and bars together. The handle comprises a top surface, a bottom surface, and an interior. The top surface and bottom surface of the handle comprise a plurality of protrusions that provide traction. The protrusions may be any variety of geometric shapes and may be arranged in a crisscross pattern. The interior of the handle comprises a plurality of guideposts for securing the wire to the handle. Optionally, the handle of the traction mat may comprise an aperture that is sized and dimensioned for receiving five fingers of a hand. The bars comprise a top surface, a bottom surface, a proximal end, and a distal end. The top surface and bottom surfaces comprise a plurality of protrusions for traction. The proximal end further comprises a plurality of tabs, where each tab has an aperture extending from the proximal end to the distal end of the bar. The wire is threaded through the aperture in the tabs of the bars to connect the bars together. The tabs provide space between the bars and allow the traction mat to be rolled into a ball. The plurality of bars may be configured to allow the traction mat to be rolled or folded.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
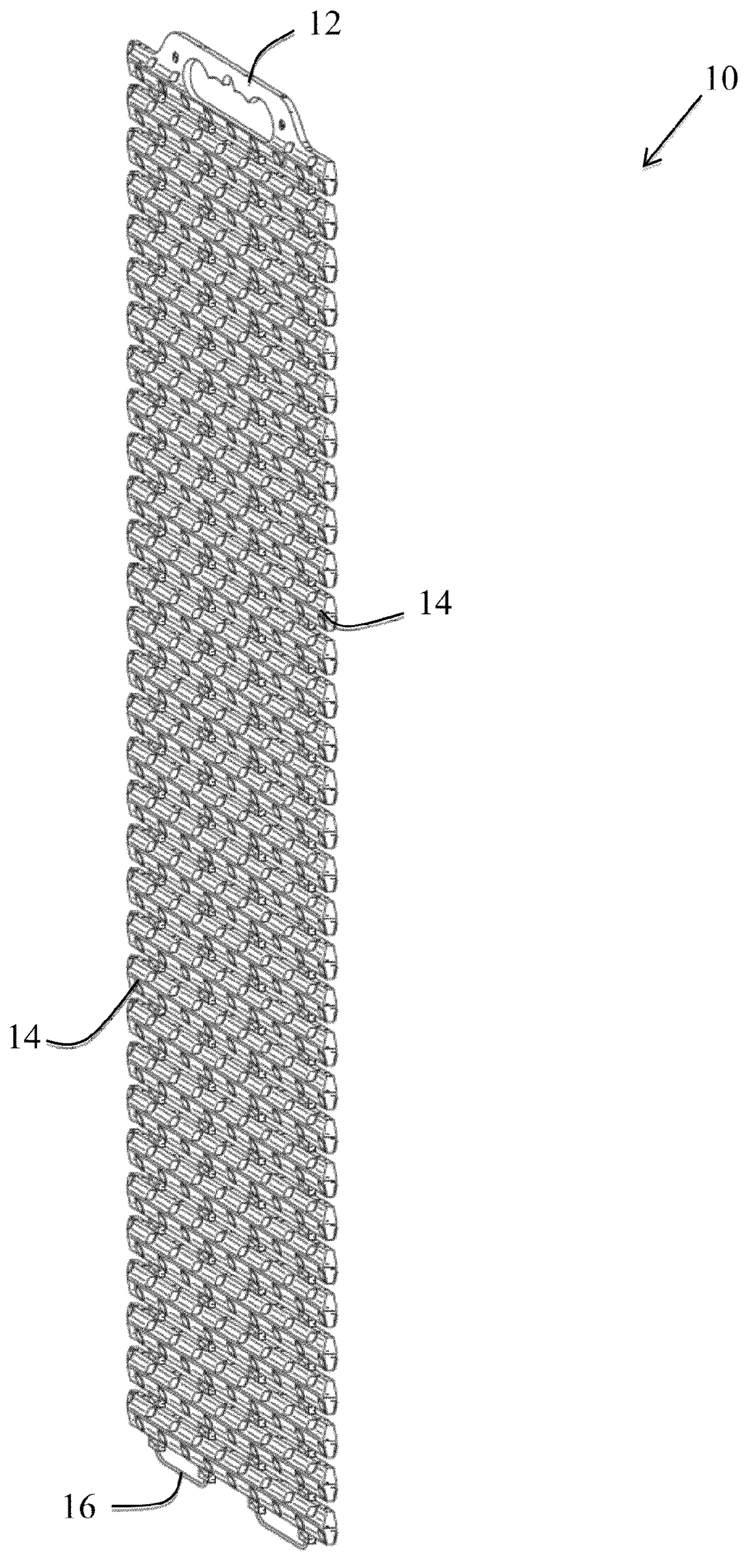
FIG. 1 is a perspective view of traction mat according to an embodiment of the invention.

Preferred embodiments of the present invention and their advantages may be understood by referring to FIGS. 1-11, wherein like reference numerals refer to like elements.

FIGS. 1-11 are schematic diagrams of presently preferred embodiments for a traction mat 10 according to the present invention. The traction mat 10 comprises a handle 12, a plurality of bars 14, and a wire 16 connecting the handle 12 and the plurality of bars 14 together.

The terms proximal and distal are relative to the handle 12. Proximal refers to a location close to the handle 12 and distal refers to an area away from the handle 12.

Referring now to FIGS. 2-6, the handle 12 comprises a first half (FIGS. 2-3), a second half (FIGS. 4-6), and an aperture 22 that extends through the first half and the second half.

Figure 2:
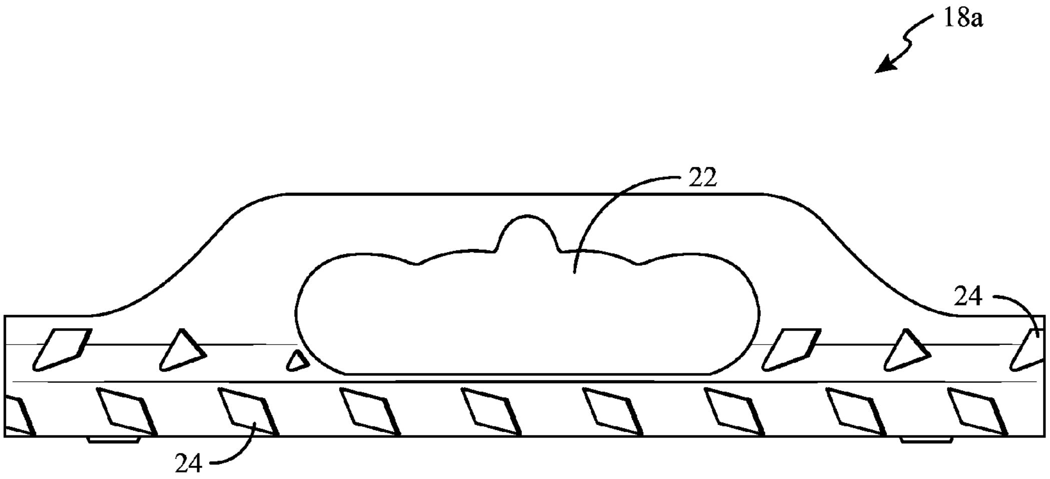
FIG. 2 is a plan view of the outer surface first side of the handle of the traction mat of FIG. 1.
Figure 3:
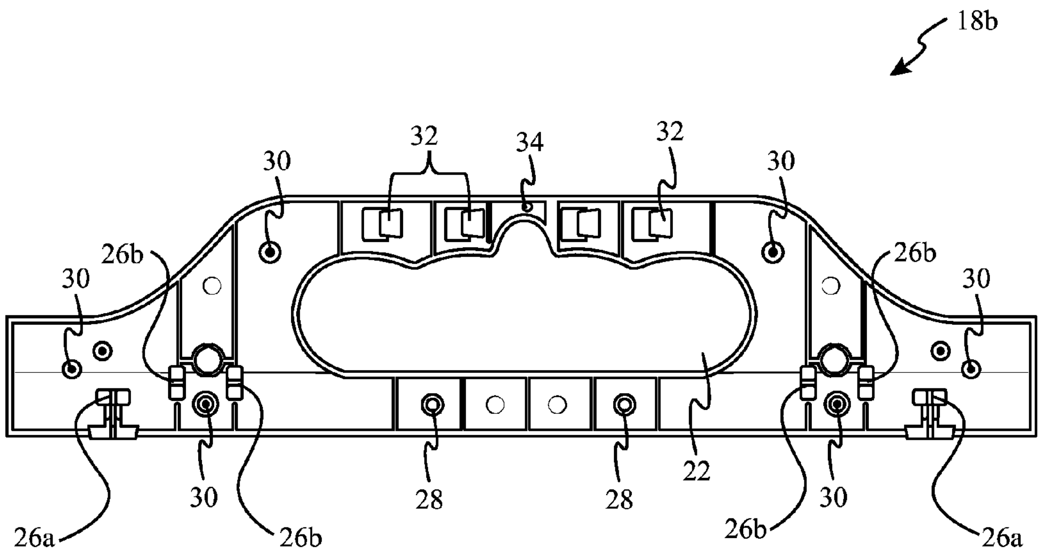
FIG. 3 is a plan view of the interior of the first side of the handle of FIG. 2.

In FIGS. 2-3, the first half of the handle 12 comprises an outer surface 18*a* (e.g., a top surface) and an interior 18*b*. As shown in FIG. 2, the outer surface 18*a* of the first half of the handle 12 comprises a plurality of protrusions 24 that provide traction to the traction mat 10.

The interior 18*b* comprises a plurality of guide posts, 26*a* and 26*b*, recesses 28, screw holes 30, tabs 32, and retaining posts 34, as shown in FIG. 3. The guide posts 26*a* and 26*b* are located on both sides of the aperture 22. One type of guide post 26*a* receives the wire 16 from the bar 14 and the second type of guide post 26*b* secures the wire 16 to the handle 12. The recesses 28 are sized and dimensioned for receiving the retaining posts 28 in the interior 20*b* of the second half of the handle 12, thereby allowing the first half and second half to snap together. The screw holes 30 are sized and dimensioned for receiving screws (not shown) to connect the first half together with the second half. The tabs 32 are sized and dimensioned to slideably connect with the tabs 42 in the interior 20*b* of the second half of the handle 12. The retaining posts 34 are sized and dimensioned for fitting in the recesses 44 in the interior 20*b* of the second half of the handle 12.

Figure 4:
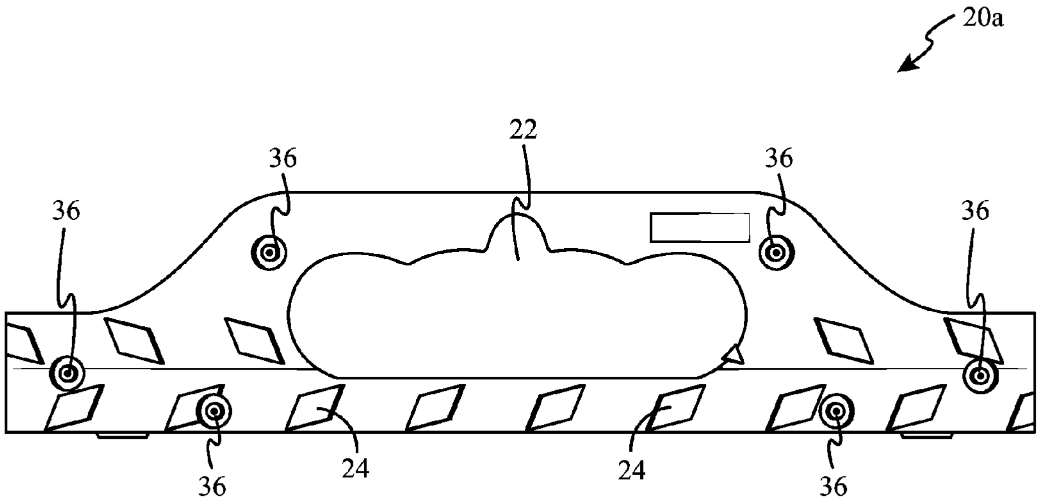
FIG. 4 is a plan view the outer surface of the second side of the handle of FIG. 2.
Figure 5:
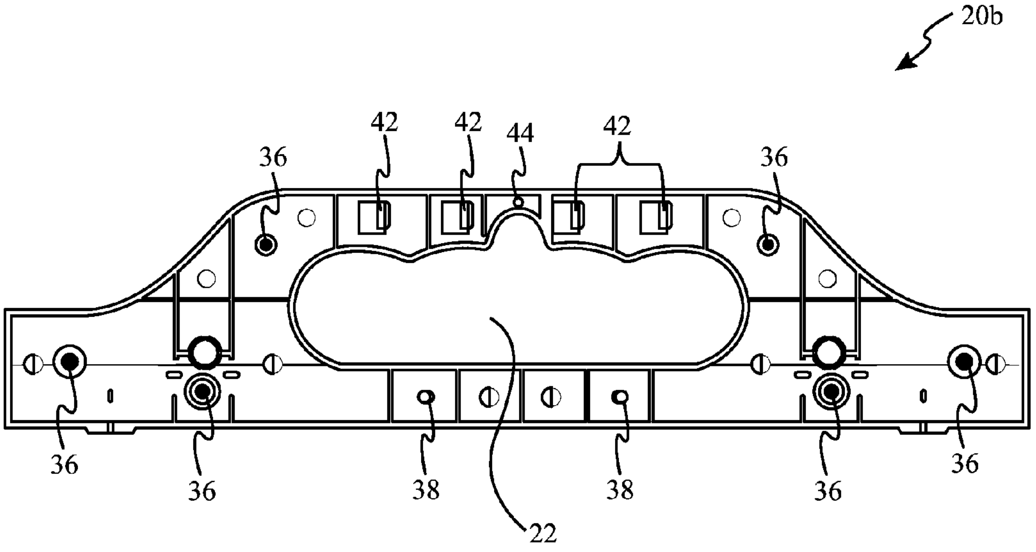
FIG. 5 is a plan view of the interior of the second side of the handle of FIG. 4.
Figure 6:
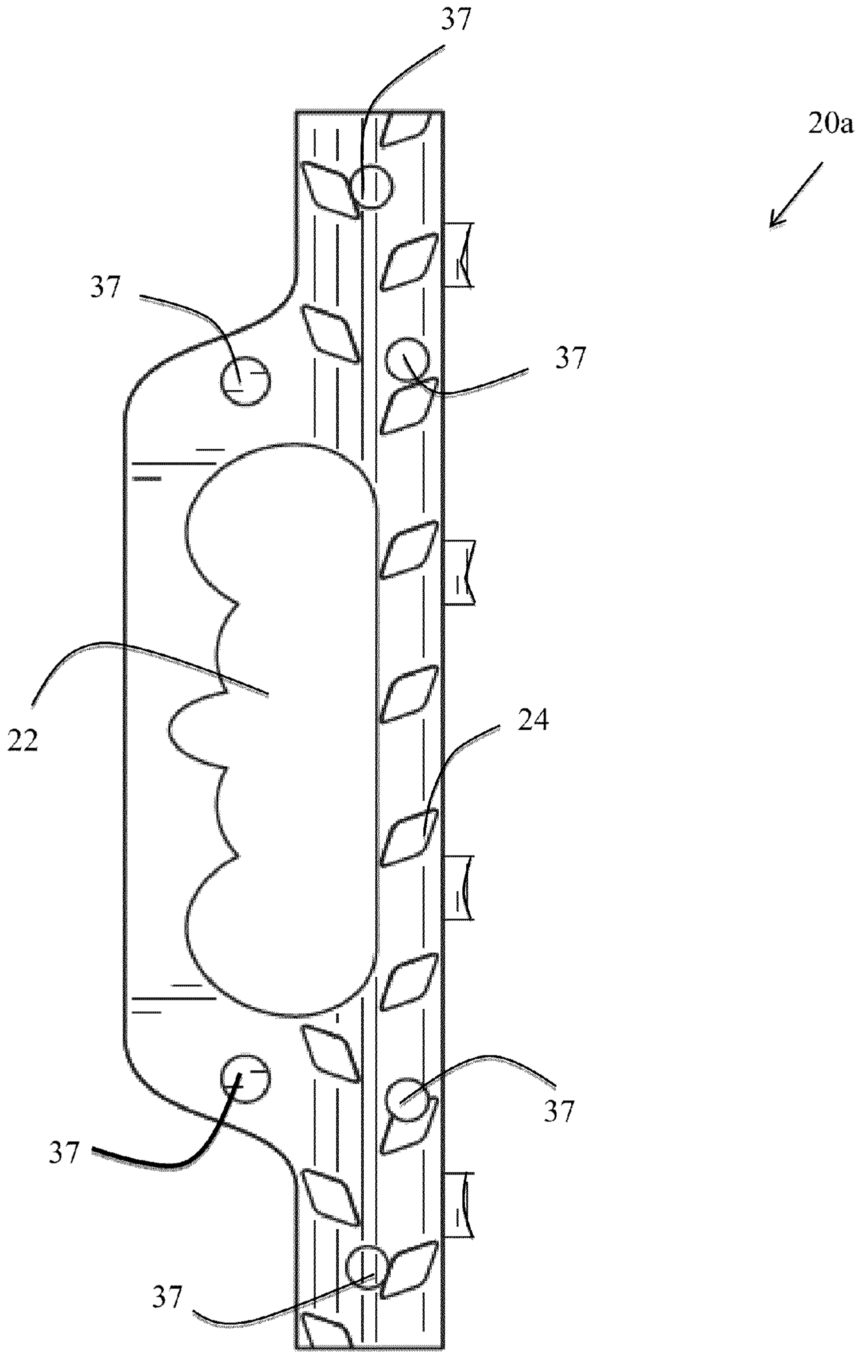
FIG. 6 is a plan view of the outer surface of the second side of the handle of FIG. 4, showing the screw covers.

In FIGS. 4-6, the second half of handle 12 comprises an outer surface 20*a* (e.g., a bottom surface) and an interior 20*b*. The outer surface 20*a* of the second half of the handle 12 comprises a plurality of protrusions 24 and a plurality of apertures 36. The apertures 36 are sized and dimensioned for receiving screws that enter the screw holes 30 in the interior 18*b* of the first half of the handle 12. The apertures 36 further comprise screw caps 37 that cover the screws to give the handle 12 a finished look and protect the screws from being exposed to water or dirt.

As shown in FIG. 5, the interior 20*b* comprises a plurality of retaining posts 38, tabs 42, and recesses 44. The retaining posts 38 are sized and dimensioned for entering the recesses 28 in the interior 18*b* of the first half of the handle 12, thereby allowing the first half and second half to snap together. The tabs 42 are sized and dimensioned to fit together with tabs 32 in the interior 18*b* of the first half of the handle 12. The recesses 44 are sized and dimensioned for receiving the retaining posts 34 in the interior 18*b* of the first half of the handle 12.

The aperture 22 of the handle 12 is sized and dimensioned for receiving all five fingers of the hand. This aperture 22 allows the user to easily grip the traction mat 10 so that he can easily place the traction mat 10 under the wheels of a vehicle.

Figure 7:
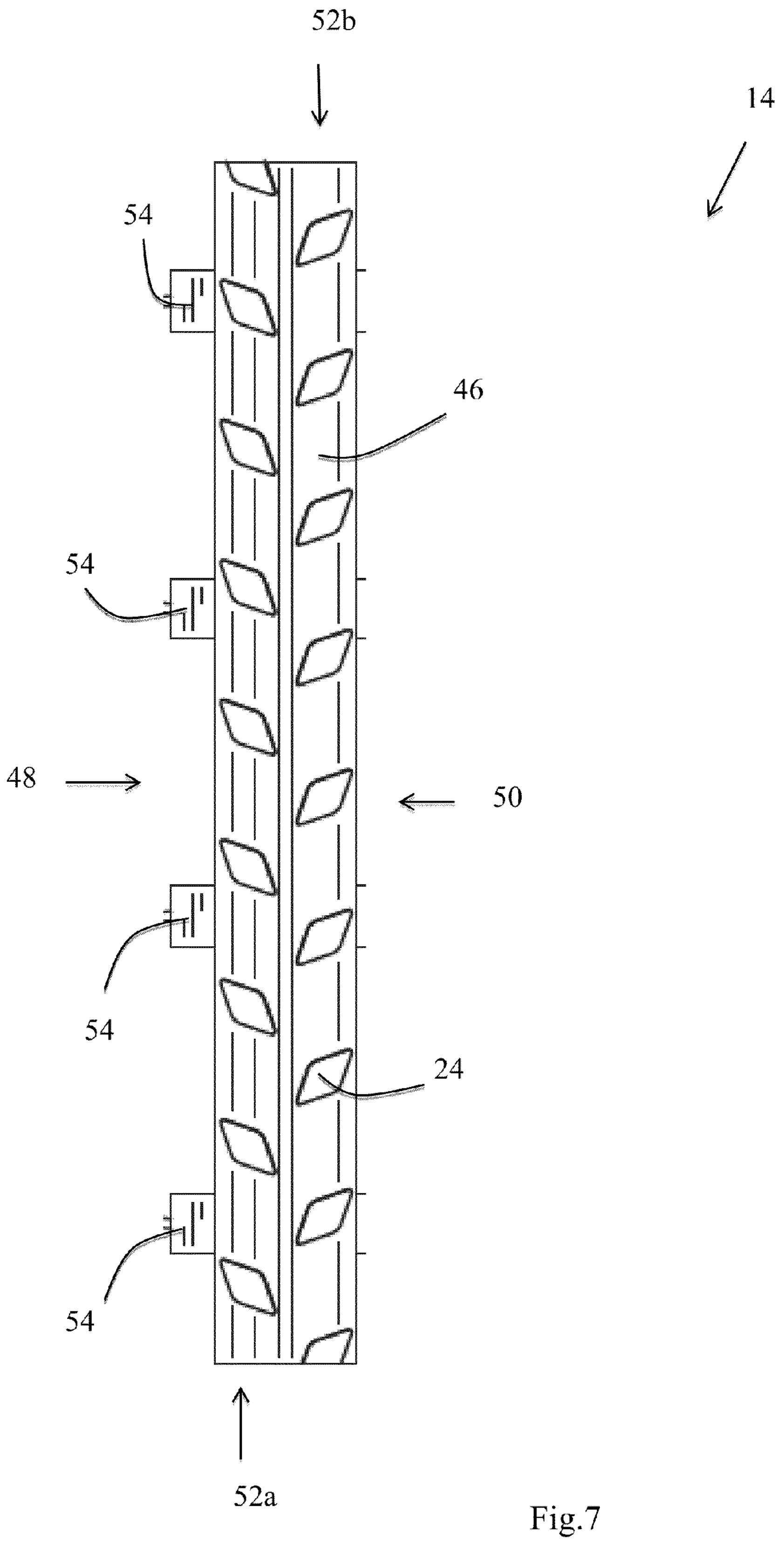
FIG. 7 is a perspective view of the bar of the traction mat of FIG. 1.
Figure 8:
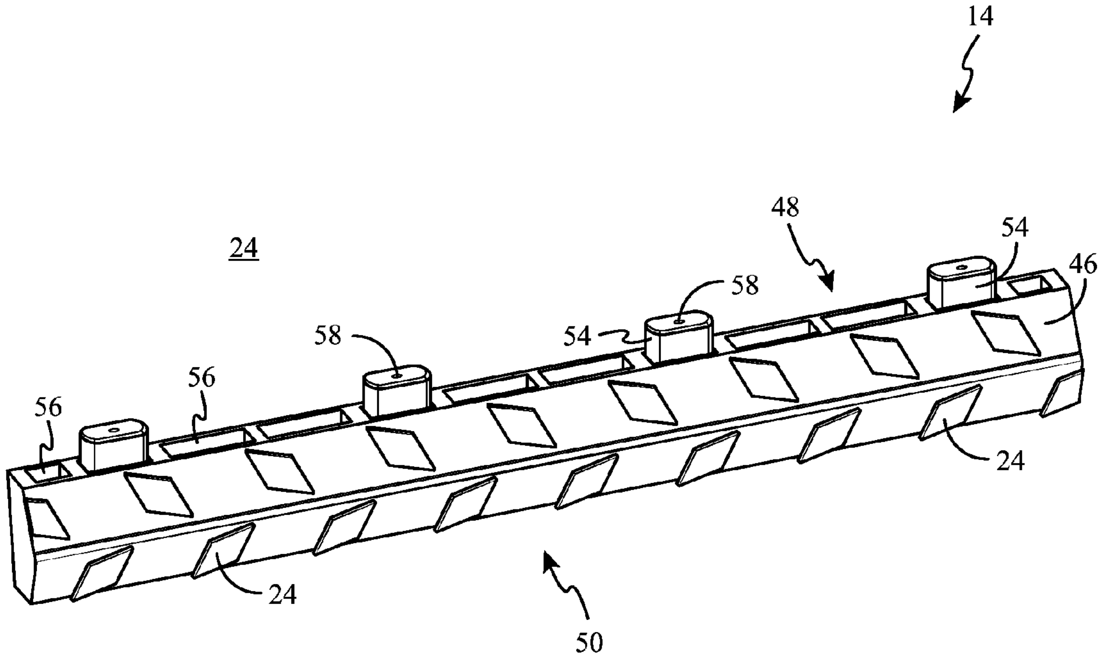
FIG. 8 is a plan view of one bar of the traction mat of FIG. 1.
Figure 9:
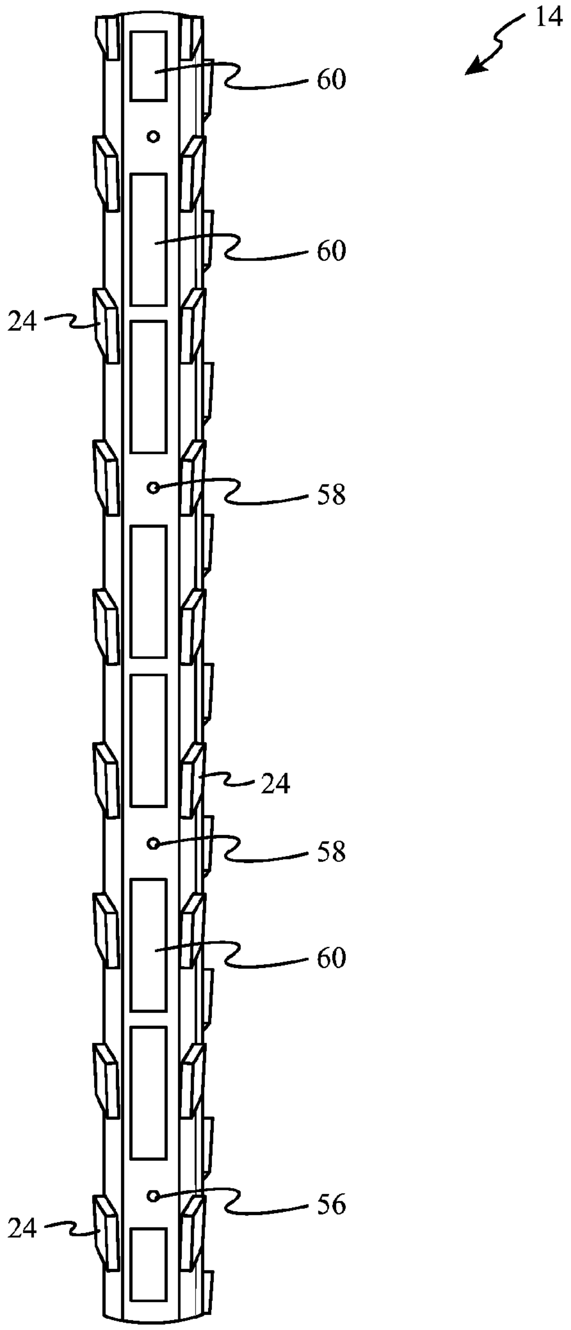
FIG. 9 is a plan view of the distal end of the bar of FIG. 7.

Referring now to FIGS. 7-9, each bar 14 comprises a body 46, having a first surface, a second surface, a proximal end 48, and a distal end 50. While the body 46 may be any type of polygon, in the preferred embodiment, the body 46 is an irregular octagon that provides several gripping surfaces for the wheels of a car, thereby increasing the traction of the wheels on the traction mat 10.

The first surface (e.g., a top surface) and second surface (e.g., a bottom surface) of the bar 14 can be identical and further comprise a plurality of protrusions 24 that provide additional traction. As shown in FIG. 7, in a first row 52*a*, the protrusions 24 face the same direction and may form an angle to the horizontal in a range of degrees to 55 degrees. In a second row 52*b*, the protrusions 24 face the same direction and may form an angle to the horizontal in a range of 125 degrees to 160 degrees. Additionally, the protrusions 24 may form a crisscross pattern, wherein one row of protrusions 24 does not directly overlap with the adjacent rows of protrusions 24. The protrusions 24 may be any geometric shape selected from the group consisting of circles, diamonds, squares, rectangles or a combination thereof. In the preferred embodiment, the protrusions 24 are diamonds that form a 45 degree angle to the horizontal in a first row 52*a* and form a 135 degree angle to the horizontal in a second row 52*b*.

Figure 10:
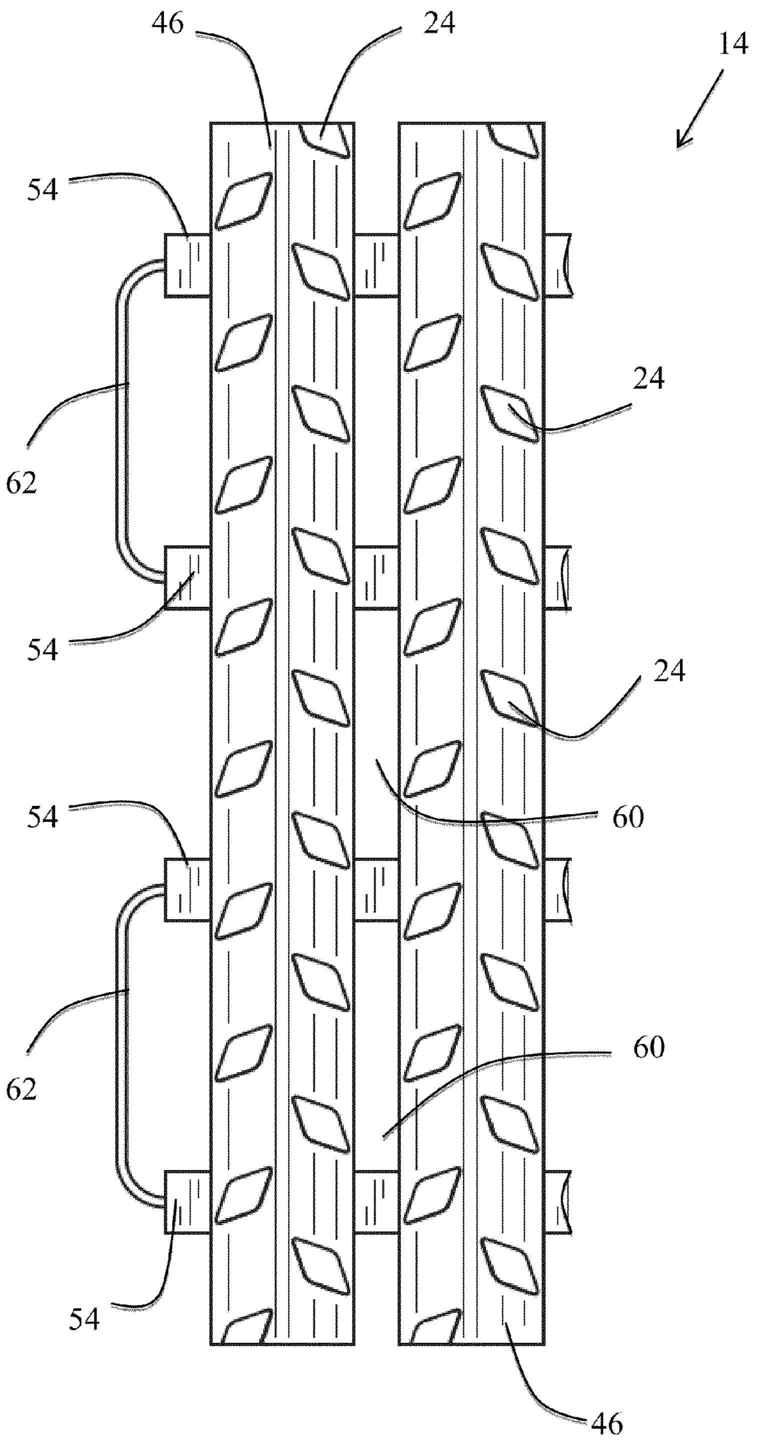
FIG. 10 is a plan view of the distal end of the traction mat of FIG. 1.
Figure 11:
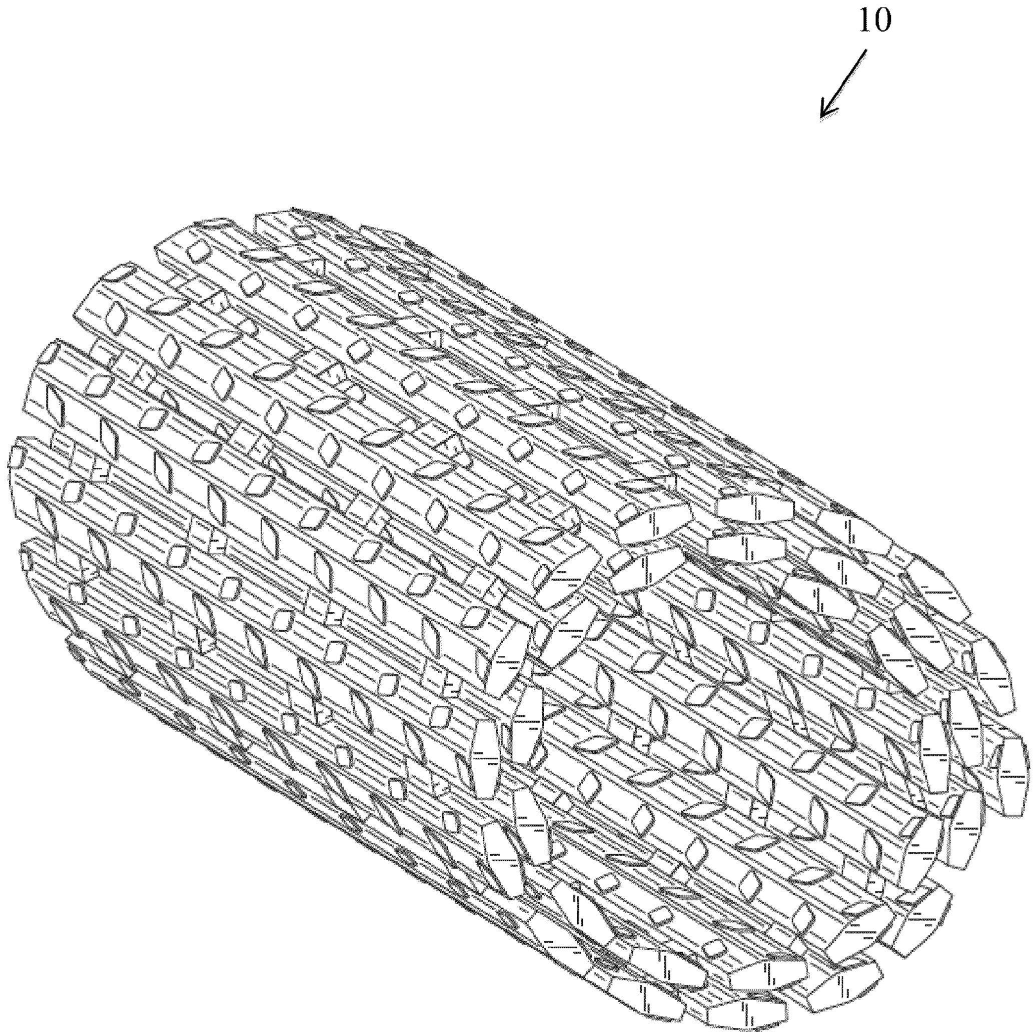
FIG. 11 is a perspective view of the traction mat in a rolled position.

In FIG. 8, the proximal end 48 of the bar 14 comprises a plurality of tabs 54 and recesses 56. Each tab 54 comprises an aperture 58 that is sized and dimensioned for receiving the wire 16. The aperture 58 extends through the tab 54 and the bar 14 and terminates at the distal end 50 of the bar 14. While the bar 14 may have any integer of tabs 54, the bar 14 in preferred embodiment has four tabs 54. The tabs 54 not only provide spaces 60 (FIG. 10) between the bars 14 where snow, sand, mud, or other road material may pass through, but they also allow the traction mat 10 to be easily rolled into a ball, as shown in FIG. 11. The recesses 56 are hollow parts of the bar 14. The recesses 56 minimize the amount of material needed for the bars 14, thereby lowering the construction cost of the traction mat 10 and the weight of the traction mat 10 itself.

In FIG. 9, similar to the proximal end 48 of the bar, the distal end 50 of the bar 14 also comprises a plurality of recesses 60 and apertures 58.

The wire 16 is a monofilament wire. This material is ideal for the traction mat 10 because it is lightweight and difficult to cut, thereby making it hard for the bars 14 to separate from each other.

To construct the traction mat 10, a knot is tied at one end of the wire 16 and covered with shrink tubing (not shown) to prevent the knot from becoming undone. The wire 16 is inserted into guide posts 26*a* and 26*b* on one side of the aperture 22 in the interior 18*b* of the first half of the handle 12. The wire 16 is threaded into the aperture 58 in the tab 54 at the proximal end 48 of the bar 14 until it comes out the distal end 50. The wire 16 is continually threaded through each bar 14 until the last bar 14 at the end of the traction mat 10 is reached. At the last bar 14, the wire 16 is bent into a U-shape 62 as shown in FIG. 10 and threaded through the distal end 50 of the bars 14 until the wire reaches the handle 12. This process of threading the bars 14 from the proximal end 48 to the distal end 50 and distal end 50 to proximal end 48 continues until the wire 16 reaches the guide posts 26*a* and 26*b* on the other side of the aperture 22 in the interior 18*b* of the first half of the handle 12. The second half of the handle 12 is placed upon the first half, whereby the recesses 28 and retaining posts 38 snap and recesses 44. Tabs 32 and tabs 42 slide together as well. Screws are screwed into the screw holes 30 to further join the first half and second half together. Finally, screw caps 37 are glued into the apertures 36 in the second half 20*b* of the handle 12 to cover the screws.

In the preferred embodiment, the handle 12, the bars 14, and the screw caps 37 are made by injection molding with high density polyethylene (HDPE). While other plastic materials harden and become brittle at temperatures as low as −30° C. (−22° F.), HDPE is able to withstand such temperatures, making the traction mat 10 suitable for slippery road surfaces in cold weather.

During slippery road conditions such as snow, mud, or sand, a user places the traction mat 10 under one wheel of a car in the direction that the car travels. The wheel grips the traction mat 10 and travels the full length of the traction mat 10, thereby extricating the car from the snow, mud, or sand. Afterwards, the user rolls the traction mat 10 into a roll as shown in FIG. 11, places the traction mat 10 into a bag (not shown), and stores the traction mat 10 in the trunk of the car for later use.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A traction mat for a wheel of a vehicle comprising:

a handle, comprising a top surface, a bottom surface, and an interior, wherein said top surface and said bottom surface comprises a plurality of protrusions and said interior comprises a plurality of guide posts;

a plurality of bars, attached to the handle, wherein each bar comprises a top surface, a bottom surface, a proximal end, and a distal end, each said top surface and each said bottom surface further comprising a plurality of protrusions, and said proximal end comprises a plurality of tabs, wherein each said tab has an aperture extending from said tab to said distal end of said bar; and a wire, beginning at said guide posts in the interior of said handle, extending through said tabs and said bars, and terminating at said guide posts in said handle.

2. The traction mat of claim 1, wherein the handle further comprises an aperture extending there through.

3. The traction mat of claim 2, wherein the aperture is sized and dimensioned for receiving five fingers of a hand.

4. The traction mat of claim 1, wherein the interior of the handle further comprises a plurality of posts that snap together.

5. The traction mat of claim 1, wherein each bar further comprises a plurality of recesses on the proximal end and on the distal end.

6. The traction mat of claim 1, wherein the plurality of protrusions are geometric shapes.

7. The traction mat of claim 6, wherein the plurality of protrusions form a crisscross pattern.

8. The traction mat of claim 1, wherein the plurality of bars and the handle are formed by injection molding of a plastic.

9. The traction mat of claim 8, wherein the plastic is high density polyethylene (HDPE).

10. The traction mat of claim 1, wherein the wire is a monofilament wire.

11. The traction mat of claim 1, wherein the plurality of bars are configured to allow the traction mat to be rolled or folded.

* * * * *